(12) United States Patent
Foiret (10) Patent No.: US 8,967,858 B2
(45) Date of Patent: Mar. 3, 2015

(54) METHOD FOR MONITORING AT LEAST TWO TEMPERATURE SENSORS OF A TURBOMACHINE

(75) Inventor: Guilhem Foiret, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/614,332

(22) Filed: Sep. 13, 2012

(65) Prior Publication Data

US 2013/0064268 A1 Mar. 14, 2013

(30) Foreign Application Priority Data

Sep. 14, 2011 (FR) ...................................... 11 58197

(51) Int. Cl.
| | | |
|---|---|---|
| G01K 1/00 | (2006.01) | |
| G01K 15/00 | (2006.01) | |
| G01K 3/00 | (2006.01) | |
| G01K 7/00 | (2006.01) | |
| F01D 17/08 | (2006.01) | |
| G01K 7/02 | (2006.01) | |

(52) U.S. Cl.
CPC .............. *F01D 17/085* (2013.01); *G01K 7/026* (2013.01); *G01K 15/007* (2013.01); *G01K 15/00* (2013.01); *F05D 2260/80* (2013.01)
USPC ........... 374/144; 374/179; 374/112; 374/166; 374/1; 374/141

(58) Field of Classification Search
USPC ...................... 374/1, 179, 112, 166, 141, 144
See application file for complete search history.

(56) References Cited

U.S. PATENT DOCUMENTS

| | | | |
|---|---|---|---|
| 4,283,634 A | 8/1981 | Yannone et al. | |
| 5,586,156 A | 12/1996 | Gaubatz | |
| 5,663,899 A | 9/1997 | Zvonar et al. | |
| 7,588,368 B2 * | 9/2009 | Hagen et al. | 374/40 |
| 2004/0168510 A1 * | 9/2004 | Wakahara et al. | 73/118.1 |
| 2006/0120430 A1 * | 6/2006 | Bayerle et al. | 374/1 |
| 2007/0047616 A1 | 3/2007 | Izumiura et al. | |
| 2009/0055070 A1 | 2/2009 | De et al. | |

FOREIGN PATENT DOCUMENTS

| | | |
|---|---|---|
| DE | 10 2007 056 559 | 5/2009 |
| WO | WO 97/07439 | 2/1997 |
| WO | WO 99/60451 | 11/1999 |
| WO | WO 2005/048809 A1 | 6/2005 |

OTHER PUBLICATIONS

International Search Report dated May 14, 2012.

* cited by examiner

*Primary Examiner* — Mirellys Jagan
(74) *Attorney, Agent, or Firm* — Pillsbury Winthrop Shaw Pittman LLP (57) ABSTRACT

A method for monitoring at least two temperature sensors of a turbomachine that is aligned along a reference plane, the two temperature sensors being located in the same transverse plane of the turbomachine, the method including detecting the stoppage of the turbomachine; waiting for a period at least equal to a predetermined threshold period; measuring the temperature with each of the two temperature sensors; comparing the two temperatures measured.

16 Claims, 4 Drawing Sheets

METHOD FOR MONITORING AT LEAST TWO TEMPERATURE SENSORS OF A TURBOMACHINE

CROSS REFERENCES TO RELATED APPLICATIONS

This application claims priority to French Patent Application No. 1158197, filed Sep. 14, 2011, the entire content of which is incorporated herein by reference in its entirety.

FIELD

The present invention relates to a method for monitoring at least two temperature sensors of a turbomachine.

BACKGROUND

A turbomachine is generally equipped with temperature sensors, for example thermocouples that are used for measuring high temperatures, or resistive probes that provide information about the temperature of the flux that passes through the turbomachine in various transverse planes of the turbomachine. In this document, the term "transverse plane" describes a plane that is perpendicular to the reference axis of the turbomachine. These temperature measurements must be extremely reliable.

Therefore, in order to make certain that the temperature measured is truly representative of the temperature of the flux in a given transverse plane of the turbomachine, two thermocouples are usually placed in each transverse plane of the turbomachine for which it is necessary to measure the temperature of the flux. Since the temperature of the flux is relatively homogeneous in the same transverse plane upstream of the combustion chamber, these two thermocouples are generally placed in the same location of the transverse plane, but downstream of the combustion chamber, as the temperature of the flux is non-homogeneous in the same transverse plane, the two thermocouples are generally placed in two different locations in the same transverse plane.

Besides this redundancy of sensors in each transverse plane, it is also essential to ensure that each of the thermocouples is not defective. This verification of the temperature sensors is simple for those that are placed upstream of the combustion chamber, since all that needs to be done is compare the temperatures measured by the two thermocouples—when the sensors are thermocouples, as is the case for exemplary purposes in the rest of this description—that are located in the same transverse plane. In fact, since these thermocouples are positioned in the same location of the transverse plane, if they are functioning correctly exactly the same temperature should be measured with both thermocouples. Conversely, if a discrepancy in the temperatures of these two thermocouples is detected, it may be deduced that one of the two thermocouples is defective.

However, such a method for monitoring the thermocouples cannot be carried out so effectively downstream of the combustion chamber, and particularly at the inlet to the low pressure turbine, because the two thermocouples in this zone are not located in at the same site of a common transverse plane, they are offset with respect to one another within the transverse plane. Accordingly, downstream of the combustion chamber the flux exhibits large thermal disparities, with the result that the temperatures measured by each sensor are different, even when the thermocouples are functioning properly. Consequently, it is no longer possible to anticipate or detect a malfunction of one of the thermocouples with the method described in the preceding, or if such a malfunction should be detected it would be with considerably delayed.

SUMMARY

An aspect of the invention is designed to overcome the drawbacks of the prior art by suggesting a method with which it is possible to detect and/or anticipate malfunctions of the temperature sensors in a turbomachine that are implemented redundantly in the same transverse plane, including those that are located downstream of the combustion chamber, and particularly those that are located inside the low pressure turbine.

In this document, the terms "upstream" and "downstream" are used with reference to the direction of movement of the flux inside the turbomachine.

In order to achieve this, according to a first aspect of the invention a method is suggested for monitoring at least two temperature sensors of a turbomachine that is oriented along a reference axis, the two temperature sensors being located in the same transverse plane of the turbomachine and the method comprising:

detecting that the turbomachine is at a standstill;
waiting for a period at least equal to a threshold period;
measuring the temperature with each of the two temperature sensors;
comparing the two measured temperatures.

Thus it is possible to monitor at least one of the two temperature sensors located in the same transverse plane for malfunction, since the two sensors do not necessarily malfunction or lose performance at the same time.

In fact, the applicant has observed that the temperature discrepancies that exist in the flux as it passes through the turbomachine while it is in operation diminish and finally disappear when the turbomachine has stopped.

The threshold period is predetermined. It is thus chosen such that, at the end of the threshold period the temperature of the flux in the same transverse plane of the turbomachine is homogeneous, or practically homogeneous, depending on the degree of accuracy desired for the monitoring method. Whatever type of turbomachine is concerned, the threshold period, at the end of which the temperature of the flux in the same transverse plane of the turbomachine is homogeneous, or practically homogeneous, is determined such that the temperature difference registered by the two sensors to be monitored is smaller than the random error of the temperature measurement system. The temperature is measured in the same transverse plane of the turbomachine in which the two temperature sensors are positioned.

Accordingly, when the two temperature sensors in the same transverse plane are functioning correctly, if the temperature is measured with these two temperature sensors at the end of a period at least equal to the threshold period after the engine has been stopped, normally both temperatures should measure the same temperature, so that the difference between the two measured temperatures should be zero. However, if one of the two temperature sensors is defective, the same temperature will not be registered by both sensors, and it will be possible to conclude that one of the sensors is defective.

The temperature is measured so that the two measured temperatures can be compared, which in turn enables the difference between the two temperature measurements to be evaluated, a value for said different that is not zero being an indication that at least one of the two sensors is defective. The act of comparing the temperatures measured with each of the sensors when the turbomachine has been switched off for a period at least equal to the threshold period thus makes it possible to detect most defects that may occur in sensors, and to anticipate a loss of performance by the sensors. The temperature measured in the same transverse plane of the turbomachine in which the two temperature sensors are located is the temperature of the air in the transverse plane in an area surrounding each of the temperature sensors in that transverse plane.

This verification of the agreement between the temperature measurements of the sensors in the same transverse plane with the turbomachine at a standstill enables a reliable measurement to be made of the temperature of the flux passing through the turbomachine when the turbomachine is functioning.

The method according to an embodiment of the invention may also feature one or more of the characteristics listed in the following, either individually or in any technically possible combination.

At the same time as the step of waiting for a period at least equal to the threshold period, the method may also comprise a step of ventilating the turbomachine for the purpose of speeding up the homogenization of the air flow temperature. In this case, the threshold period is reduced. The greater the ventilation, the more the threshold period is reduced.

In an embodiment, the method is beneficially implemented before every restart of the turbomachine when the turbomachine has been stopped for a period at least equal to the threshold period. In fact, implementing the method before each restart of the turbomachine makes it possible to wait for a maximum period between the last stoppage of the turbomachine and the time when the temperatures are measured, which in turn maximizes the thermal homogeneity in the turbomachine, provided the engine has been stopped for a period at least equal to the threshold period.

The step of comparing the two measured temperatures beneficially comprises a step of calculating the difference between the two measured temperatures. This calculated difference may then be compared with one or more theoretical differences. In fact, it is conceivable for example that if the calculated difference is smaller than a first theoretical difference, 0.5° C. for example, it may be deduced that the two temperature sensors are functioning correctly. Otherwise, if the calculated difference is a value between the first theoretical difference and a second theoretical difference, it may be deduced that a malfunction of one of the sensors might occur soon and that the functional performance of one of the sensors is deteriorating, and if the calculated difference has a third theoretical value, it may be deduced that one of the sensors is defective.

It is also possible to select the one or more theoretical differences as a function of the chosen threshold period: indeed, if the threshold period is relatively short, for example because the stoppage periods inserted between two operations are relatively short, the values of the theoretical differences selected may be larger to take into account the fact that the turbomachine has not reached complete thermal homogenization when the temperatures are measured. Conversely, the longer the threshold period the smaller the theoretical differences may be, since in this case the turbomachine will have reached complete thermal homogenization.

The method beneficially also comprises a step of recording the calculated difference between the two measured temperatures. This recording step enables the performance of the temperature sensors to be tracked over time, and in particular their aging and any performance deterioration associated with such aging.

The recorded differences are beneficially used to calculate a trend in the difference between the measured temperatures. In fact, it is possible to attempt to predict the aging behavior of the sensors on the basis of a trend analysis of past calculated differences, in order to engage in predictive monitoring of these temperature sensors and observe the progress of their deterioration.

According to an embodiment, the method further comprises a step of sending an alert when a malfunction of one of the sensors is detected and/or anticipated. In fact, as was explained previously, several theoretical differences may be chosen, with which the calculated difference is compared: one of these theoretical differences may correspond to an effective failure of one of the sensors, whereas another of these theoretical differences may correspond to the first indication of a failure of a sensor, and thus to a deterioration in the operating state of the sensor, wherein this first indication of a failure may serve to presage a future breakdown of the sensor, particularly when the calculated difference is correlated with other previously calculated differences, all of these calculated differences together indicating that the difference between the temperature measurements performed by these two sensors is increasing in size.

The method may be used to monitor all the temperature sensors of a turbomachine provided that the two temperature sensors are positioned in the same transverse plane of the turbomachine. At all events, the method is particularly beneficial when it is used to monitor temperature sensors that are located downstream of a combustion chamber of the turbomachine, since the temperature sensors that are in the same transverse plane downstream of the combustion chamber are generally positioned at different sites in the transverse plane, which renders them extremely sensitive to the temperature variations that exist in the airflow downstream of the combustion chamber.

The method according to an embodiment of the invention is also particularly applicable in the case in which the two temperature sensors are located inside the low pressure turbine, or more generally downstream of the combustion chamber, where the airflow exhibits greater temperature variations.

In an embodiment, the method is also used when the two temperature sensors are aligned essentially or substantially horizontally, because the air is homogenized by horizontal strata.

The method according to an embodiment of the invention may be used to monitor two temperature sensors that are located in the same transverse plane, or also to monitor two sets of temperature sensors located in the same transverse plane. In the first case, the temperature sensors may be monitored in pairs by comparing the temperature measurements that are made by two sensors aligned essentially horizontally, or they may be monitored in groups of two by first calculating an average from the temperatures measured by the temperature sensors in a first group of sensors, then calculating an average from the temperatures measured by the temperature sensors in a second group of sensors, and finally be comparing the two averages obtained.

An aspect of the invention also relates to a calculator that is capable of implementing the method according to an embodiment of the invention, and a turbomachine in which this method is implemented.

BRIEF DESCRIPTION OF THE DRAWINGS

Other characteristics and benefits of the invention will be appreciated upon reading the following detailed description with reference to the accompanying drawing, in which.

For the sake of improved comprehension, identical or similar elements are identified in all of the figures by the same reference signs.

DETAILED DESCRIPTION

Figure 1:
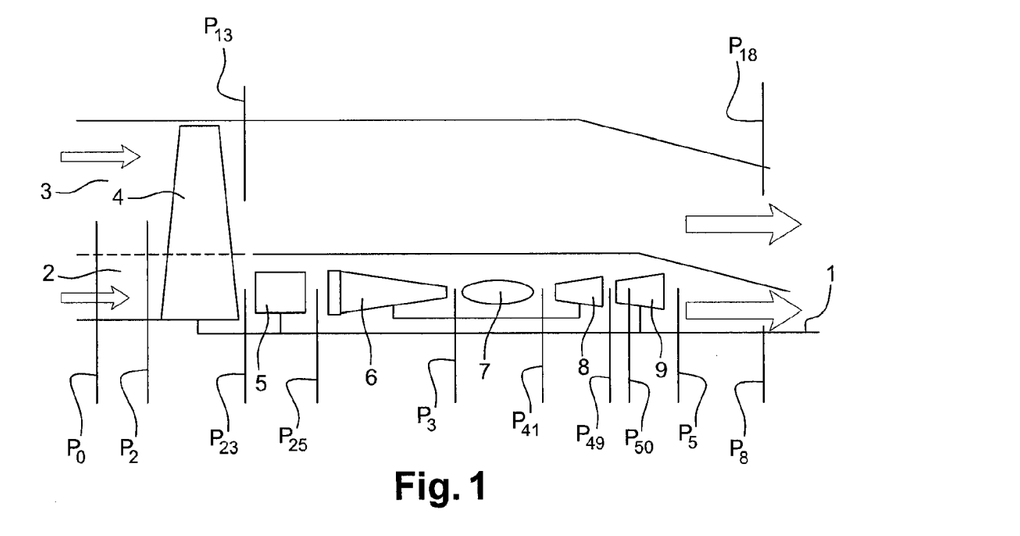
FIG. 1 is a diagrammatic representation of a cross section through a turbomachine in which a method according to an embodiment of the invention may be used.

FIG. 1 represents a turbomachine to which a method according to an embodiment of the invention may be applied.

This turbomachine conventionally comprises blower 4, a low pressure compressor 5, a high pressure compressor 6, a combustion chamber 7, a high pressure turbine 8, a low pressure turbine 9. The turbomachine is oriented along a reference axis 1. In a turbomachine, it is desirable to know the temperature of the flux at different points in the turbomachine, these points being spaced longitudinally along the reference axis. To enable this, a series of transverse planes are defined in the turbomachine, that is to say planes that are essentially or substantially perpendicular to the reference axis, and the temperature of the flux is measured in each of these transverse planes. A number of these planes $P_0$ à $P_{50}$ are shown in FIG. 1.

Figure 2:
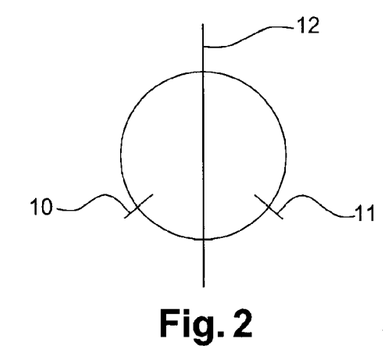
FIG. 2 is a diagrammatic representation of two temperature sensors in the same transverse plane of the turbomachine of FIG. 1, to which a method according to an embodiment of the invention is applied.

FIG. 2 represents a frontal view of plane $P_{50}$ which is located downstream of the combustion chamber, and more precisely inside the low pressure turbine, on the inlet side of this low pressure turbine 9. Two temperature sensors 10 and 11 are positioned in this transverse plane. These two temperature sensors are identical and function to the same degree of accuracy. These two temperature sensors may be thermocouples, for example.

These two temperature sensors 10, 11 are not located in the same place in the transverse plane, but at different sites as represented in FIG. 2. In an embodiment, these two sensors are preferably aligned essentially or substantially horizontally for most of the time during operation when the turbomachine is in operation. These two sensors are preferably arranged essentially or substantially symmetrically about a transverse axis 12, which is perpendicular to reference axis 1 and is incorporated in the transverse plane in which the two sensors 10, 11 are located.

Figure 5:
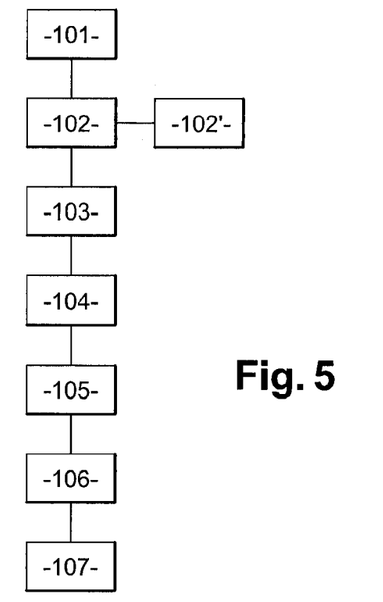
FIG. 5 is a diagrammatic representation of the procedures of a method according to an embodiment of the invention.

A method for monitoring the malfunction of these two temperature sensors is described with reference to FIG. 5. This method comprises a first step 101 of detecting that the engine has stopped, followed by a step 102 of waiting for period at least equal to a threshold period after the engine has stopped. This minimum threshold, during which the temperature of the airflow is allowed to equalize in the transverse plane is predetermined and is influenced by many factors: it particularly depends on the type of turbomachine in which the method is being implemented, the outside temperature, whether the turbomachine is ventilated or not when it is stopped, or the diameter of the turbomachine in question. Accordingly, a small diameter favors rapid homogenization of the temperature in the transverse planes of the turbomachine after the engine has stopped. Therefore, the threshold period for a turbomachine with a small diameter will be shorter than the period for a turbomachine with a larger diameter. The threshold period selected also depends on the accuracy of the temperature sensors and the accuracy one intends to achieve using the monitoring method.

Whatever type of turbomachine is concerned, the threshold period, at the end of which the temperature of the flux in the same transverse plane of the turbomachine is homogeneous, or practically homogeneous, is determined such that the temperature difference registered by the two sensors to be monitored is smaller than the random error of the temperature measurement system. In order to satisfy this criterion, various means or systems may be available for predetermining this threshold period: if the turbomachine in which the method is to be implemented is already in service, an engine cooling database is available based on the measurements taken during the turbomachine's service life. Thus the threshold period may be determined statistically using the data in this database to satisfy the criterion according to which the difference between the temperatures observed by the sensors to be monitored must be smaller than the random error of the temperature measurement system;

if this engine cooling database is not available, that is to say if no engine cooling data is available for the turbomachine in which the method is to be implemented, a thermal cooling model may be available. In this case, the threshold period may be determined on the basis of this model to satisfy the criterion according to which the difference between the temperatures observed by the sensors to be monitored must be smaller than the random error of the temperature measurement system;

if neither the engine cooling database nor the thermal cooling model is available, this threshold period maybe determined experimentally. It may be determined on the basis of experience acquired with other turbomachines or experimentally prior to the implementation of the method by measuring the progression of the discrepancy between the temperatures measured by each of temperature sensors 10, 11 as a function of time beginning when the engine stops.

Figure 6:
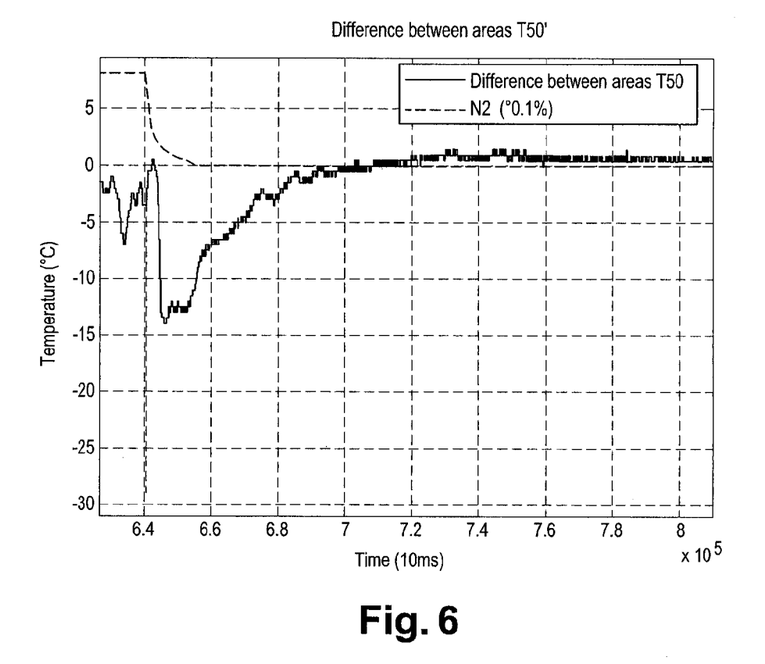
FIG. 6 is a graph showing the progression of the difference between the temperatures measured by the sensors of FIG. 3 during a first stoppage of the turbomachine when the outside temperature is 20° C.

Accordingly, FIG. 6 shows the progression of the difference between the temperatures measured by the two sensors 10, 11 as a function of time when the outside temperature is equal to 20° C. and the engine is stopped for the first time. With this graph, it can be determined that in this case a threshold period of 15 minutes is required before the difference between the temperatures measured by sensors 10 and 11 is less than 1° C.

Figure 7:
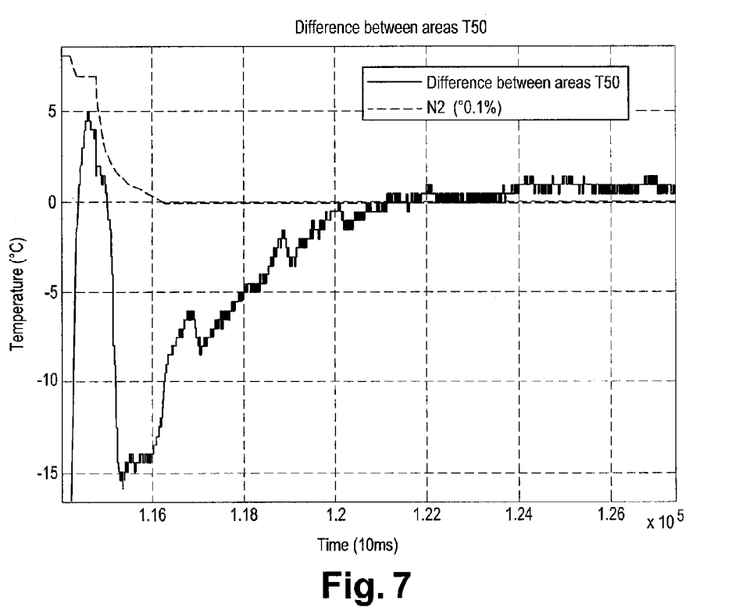
FIG. 7 is a graph showing the progression of the difference between the temperatures measured by the sensors of FIG. 3 during a second stoppage of the turbomachine when the outside temperature is 20° C.

FIG. 7 shows the progression of the difference between the temperatures measured by the two sensors 10, 11 as a function of time when the outside temperature is equal to 20° C. and the engine is stopped for the second time, having been restarted after the previous stoppage of 15 minutes. With this graph, it can be determined that in this case a threshold period equal to 15 minutes is also required before the difference between the temperatures measured by sensors 10 and 11 is less than 1° C.

Figure 8:
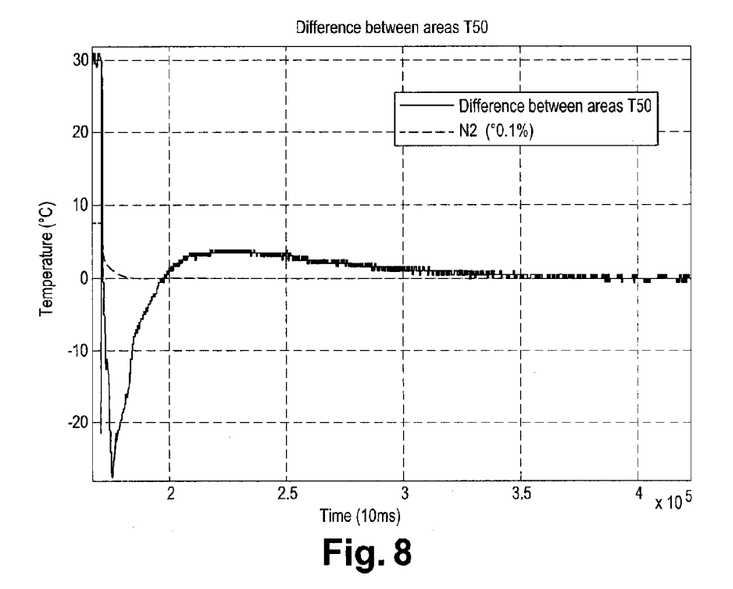
FIG. 8 is a graph showing the progression of the difference between the temperatures measured by the sensors of FIG. 3 during a first stoppage of the turbomachine when the outside temperature is 2° C.

FIG. 8 shows the progression of the difference between the temperatures measured by the two sensors 10, 11 as a function of time when the outside temperature is equal to 2° C. and the engine is stopped for the first time. With this graph, it can be determined that in this case a threshold period equal to 30 minutes is required before the difference between the temperatures measured by sensors 10 and 11 is less than 0° C.

Figure 9:
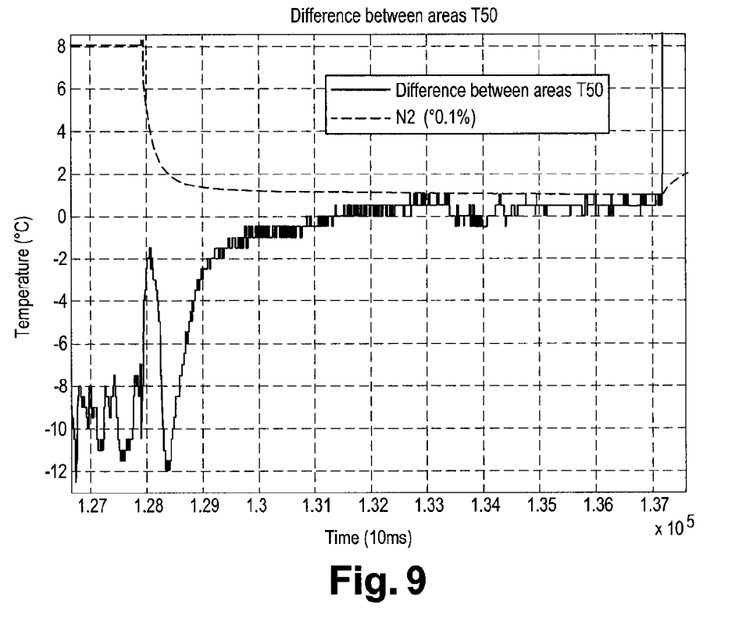
FIG. 9 is a graph showing the progression of the difference between the temperatures measured by the sensors of FIG. 3 during a first stoppage of the turbomachine when the outside temperature is 4° C. and the turbomachine is ventilated.

FIG. 9 shows the progression of the difference between the temperatures measured by the two sensors 10, 11 as a function of time when the outside temperature is equal to 4° C. and the engine is stopped for the first time, and the turbomachine is dry ventilated. With this graph, it can be determined that in this case a threshold period equal to 7 minutes is required before the difference between the temperatures measured by sensors 10 and 11 is less than 1° C.

Figure 10:
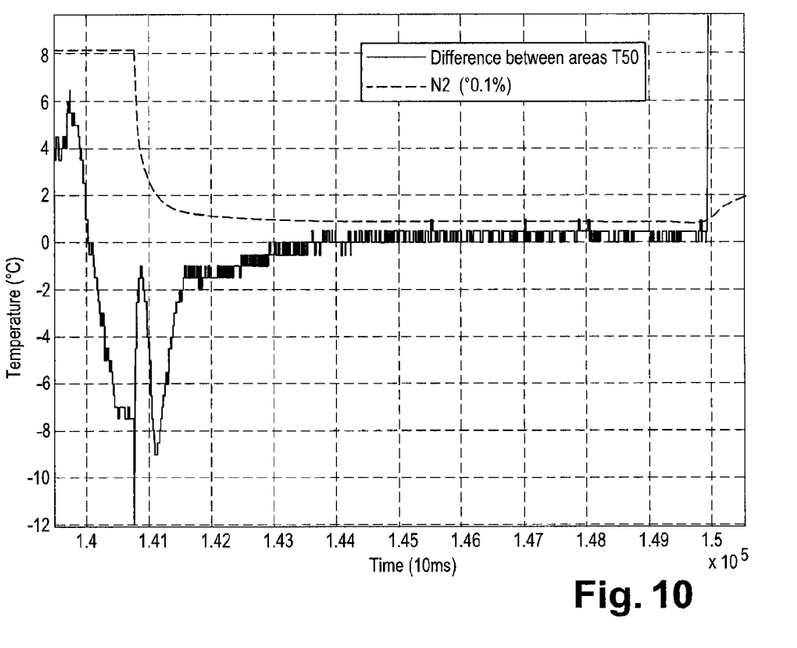
FIG. 10 is a graph showing the progression of the difference between the temperatures measured by the sensors of FIG. 3 during a second stoppage of the turbomachine when the outside temperature is 4° C. and the turbomachine is ventilated.

FIG. 10 shows the progression of the difference between the temperatures measured by the two sensors 10, 11 as a function of time when the outside temperature is equal to 4° C. and the engine is stopped for the second time, having been restarted following a previous stoppage of 7 minutes. With this graph, it can be determined that in this case a threshold period equal to 6 minutes is required before the difference between the temperatures measured by sensors 10 and 11 is less than a 1° C.

In step 102, the turbomachine is therefore stopped for a period at least equal to a threshold period that has been predetermined for example as explained with reference to FIGS. 6 to 10.

The method may also comprise a step 102', performed simultaneously with step 102, during which the turbomachine is ventilated so as to speed up the thermal homogenization.

The method then comprises a step 103 of measuring the temperature with each of the temperature sensors 10, 11. In order to allow the airflow temperature to become as homogeneous as possible, it is beneficial to perform this temperature measurement step with each of the temperature sensors just before restarting the turbomachine, when the turbomachine has been stopped for a period at least equal to the threshold period. In addition, in order to track the development of the temperature sensors it is beneficial to carry out this measurement step every time before the turbomachine is restarted.

The method then comprises a step 104 of comparing the temperatures measured by these temperature sensors in order to evaluate the difference between the two temperature measurements.

This comparison step may consist of a direct comparison of the two temperatures measured, or it may include a step of calculating the difference between the two temperatures measured, then comparing this difference with one or more theoretical differences.

If temperature sensors 10, 11 are functioning properly, the temperatures measured by each of the sensors 10, 11 must be equal, or essentially equal, with allowance for a permitted margin of error between these sensors.

On the other hand, if temperature sensors 10, 11 begin to deteriorate and their operating performance begins to worsen, due to an anomaly in their sensing element, pollution, erosion or soiling of the probe for example, or even wear or breakage of their connectors, the temperatures measured by the two sensors will begin to diverge. A small difference between the two measured temperatures may be an early sign that a sensor is beginning to malfunction, and accordingly of functional deterioration, especially if the difference between the two measured temperatures increases over time, while a substantial different between the two measured temperatures may indicate that one of the sensors has already failed.

Accordingly, the difference between the measured temperatures may be compared to several theoretical differences: if the difference between the measured temperatures is smaller than a first theoretical difference, it may be deduced that the two sensors are functioning as they should. If the difference between the measured temperatures is a value between the first theoretical temperature and a second theoretical temperature, it may be deduced that one of the sensors is beginning to show signs of defects and that its functional performance is deteriorating. If the difference between the measured temperatures is greater than the second theoretical temperature, it may be deduced that one of the sensors is faulty and that the measurements it returns are no longer reliable. The difference between the measured temperatures may also be compared with other theoretical differences to monitor the sensors more accurately.

In a step 105, the differences between the measured temperatures may be also be stored in a memory before every restart so that the aging of the sensors and thus also any deterioration in this functional performance may be monitored.

In a step 106, the differences between the measured temperatures before each restart may also be used to calculate trends in the condition of the sensors in order to predict their aging.

The method may also comprise a step 107 of sending a warning message if a malfunction of the sensors is detected in step 104, and/or if the comparison carried out in step 104 and/or the trend calculation indicates that one of the sensors is likely to malfunction in the near future.

The method as described in the preceding thus enables monitoring of temperature sensors in the same transverse plane. More particularly, this method enables future malfunctions of these sensors to be anticipated, thus enabling the deterioration of these sensors to be tracked and malfunctions that have occurred to be detected, despite the existence of temperature variations in the transverse planes downstream from the combustion chamber.

The method as described in the preceding is applicable to all temperature sensors, provided at least two temperature sensors are located in the same transverse plane. At all events, this method is particularly useful for temperature sensors located downstream from the combustion chamber, when the two sensors are not located in the same place in the transverse plane, and particularly for sensors that are located in the low pressure turbine while the air flow is thermally heterogeneous.

Moreover, the method is applicable to all arrangements of temperature sensors, not only the arrangement represented in FIG. 2. At all events, in order for the method to be truly effective, it is desirable that the temperature sensors to which the method is applied are aligned essentially or substantially horizontally. It is also desirable for these sensors to be arranged symmetrically about a transverse axis 12 incorporated in the transverse plane in which the sensors are located, the transverse axis being perpendicular to the reference axis.

Figure 3:
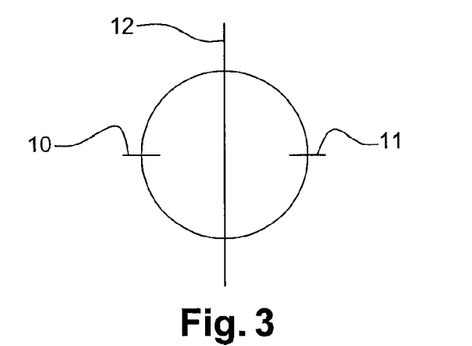
FIG. 3 is a diagrammatic representation of two other temperature sensors in the same transverse plane of the turbomachine of FIG. 1, to which a method according to an embodiment of the invention is applied.
Figure 4:
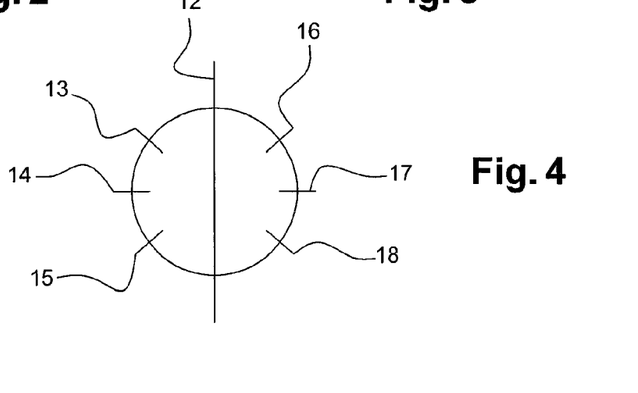
FIG. 4 is a diagrammatic representation of a set of temperature sensors in the same transverse plane of the turbomachine of FIG. 1, to which a method according to an embodiment of the invention is applied.

Thus, the method according to an embodiment of the invention also applies to the sensors 10, 11 represented in FIG. 3, or sensors 13 to 18 represented in FIG. 4. In fact, the method may be applied when the turbomachine includes more than two temperature sensors in the same transverse plane, as represented in FIG. 4. In this case, an average may be calculated from the temperatures measured by sensors 13, 14, 15 that are located on one side of transverse axis 12, and another average may be calculated from the temperatures measured by sensors 16, 17, 18, which are located on the other side of transverse axis 12. As was explained in the preceding, the temperatures measured by the temperature sensors on one side of the reference axis may then be compared with the temperatures measured by sensors 16, 17, 18, which are located on the other side of transverse axis 12.

Alternatively, it is possible to not calculate an average from the temperatures measured by the sensors located on either side of the transverse axis, but instead to compare the temperatures measured by the sensors on one side of the transverse axis in pairs directly with their counterparts on the other side. In the case of FIG. 4, the comparison is made as follows:

the temperature measured by temperature sensor 13 with the temperature measured by temperature sensor 16;

the temperature measured by temperature sensor 14 with the temperature measured by temperature sensor 17;

the temperature measured by temperature sensor 15 with the temperature measured by temperature sensor 18.

These comparisons may be direct, as explained in the preceding or they may be carried out by calculating the difference between these temperatures and by comparing this calculated difference with one or more theoretical differences.

The method as described with reference to FIGS. 1 to 10 enables detection of all defects of the temperature sensors with the exception of those that are only visible in the presence of an airflow.

At all events, in order to detect the defects that are only detectable in the presence of an airflow, such as erosion or soiling of the thermocouples, it is conceivable to ventilate the turbomachine in such manner that an airflow passes through it at constant temperature while the temperature sensors are measuring the temperature.

It will be appreciated that the invention is not limited to the embodiments described with reference to the figures and variants that might be conceivable without exceeding the scope of the invention.

The invention claimed is:

1. A method for monitoring the malfunction of at least one of at least two temperature sensors of a turbomachine that is aligned along a reference axis, the two temperature sensors being located in a same transverse plane of the turbomachine, the method comprising:

detecting the stoppage of the turbomachine;

waiting for a period at least equal to a predetermined threshold period after said stoppage of the turbomachine;

after said waiting, measuring the temperature in said same transverse plane of the turbomachine in which the two temperature sensors are located, with each of the two temperature sensors;

comparing the two temperatures measured for the purpose of evaluating a discrepancy between the two temperature measurements, a non-zero value for such discrepancy being a sign of a malfunction of at least one of the at least two sensors, wherein the predetermined threshold period is selected such that at an end of the predetermined threshold period, the temperature of an airflow that passes through the turbomachine is substantially homogeneous in the transverse plane.

2. The method according to claim 1, wherein said method is implemented before every restart of the turbomachine, after the turbomachine has been stopped for a period at least equal to the threshold period.

3. The method according to claim 1, wherein the two temperature sensors are located downstream of a combustion chamber of the turbomachine.

4. The method according to claim 3, wherein the two temperature sensors are located inside a low pressure turbine.

5. The method according to claim 3, wherein the two temperature sensors are aligned essentially horizontally.

6. The method according to claim 1, wherein comparing the two measured temperatures comprises calculating a difference between the two measured temperatures.

7. The method according to claim 6, comprising sending an alert when a malfunction of one of the temperature sensors is detected or anticipated.

8. The method according to claim 6, comprising recording the calculated difference between the two measured temperatures.

9. The method according to claim 8, wherein recorded differences are used to calculate a trend in the difference between the measured temperatures.

10. A method for monitoring the malfunction of at least one of at least two temperature sensors of a turbomachine that is aligned along a reference axis, the two temperature sensors being located in a same transverse plane of the turbomachine, the method comprising:

detecting the stoppage of the turbomachine;

waiting for a period at least equal to a predetermined threshold period after said stoppage of the turbomachine;

ventilating the turbomachine simultaneously with said waiting for a period at least equal to the threshold period;

measuring the temperature in said same transverse plane of the turbomachine in which the two temperature sensors are located, with each of the two temperature sensors;

comparing the two temperatures measured for the purpose of evaluating a discrepancy between the two temperature measurements, a non-zero value for such discrepancy being a sign of a malfunction of at least one of the at least two sensors.

11. A method for monitoring the malfunction of at least one of at least two temperature sensors of a turbomachine that is aligned along a reference axis, the two temperature sensors being located in a same transverse plane of the turbomachine, the method comprising:

detecting the stoppage of the turbomachine;

waiting for a period at least equal to a predetermined threshold period after said stoppage of the turbomachine before measuring the temperature in said same transverse plane of the turbomachine in which the two temperature sensors are located;

after said waiting, measuring the temperature in said same transverse plane of the turbomachine in which the two temperature sensors are located, with each of the two temperature sensors;

comparing the two temperatures measured for the purpose of evaluating a discrepancy between the two temperature measurements, a non-zero value for such discrepancy being a sign of a malfunction of at least one of the at least two sensors, wherein the predetermined threshold period is selected such that at an end of the predetermined threshold period, the temperature of an airflow that passes through the turbomachine is substantially homogeneous in the transverse plane.

12. The method according to claim 11, wherein said method is implemented before every restart of the turbomachine, after the turbomachine has been stopped for a period at least equal to the threshold period.

13. The method according to claim 11, wherein comparing the two measured temperatures comprises calculating a difference between the two measured temperatures.

14. The method according to claim 13, comprising sending an alert when a malfunction of one of the temperature sensors is detected or anticipated.

15. The method according to claim 13, comprising recording the calculated difference between the two measured temperatures.

16. The method according to claim 15, wherein recorded differences are used to calculate a trend in the difference between the measured temperatures.

* * * * *